Oct. 22, 1946. J. C. OWENS 2,409,890
ANTISIPHON BALL COCK VALVE
Filed Aug. 6, 1943
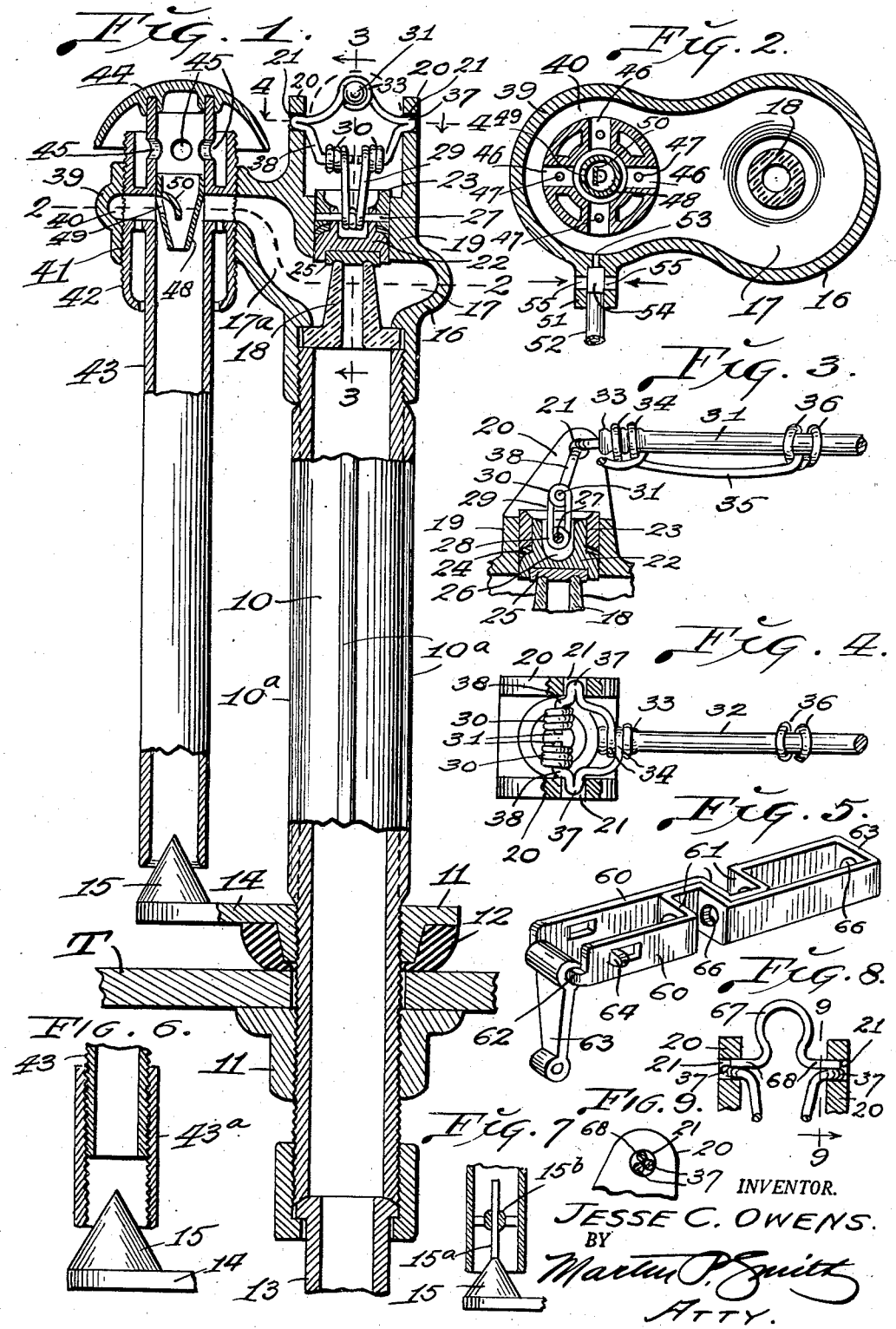
INVENTOR.
JESSE C. OWENS.
BY
Martin P. Smith
ATTY.

Patented Oct. 22, 1946

2,409,890

UNITED STATES PATENT OFFICE 2,409,890

ANTISIPHON BALL COCK VALVE

Jesse C. Owens, Los Angeles, Calif.

Application August 6, 1943, Serial No. 497,602

4 Claims. (Cl. 137—104)

1

My invention relates to an anti-siphon ball cock valve to be used for the flushing of toilet tanks and the construction herein illustrated and described is an improvement on the Siphonic valve forming the subject matter of United States Letters Patent Number 2,290,145, issued to me on July 14, 1942, also the Anti-siphon, ball cock and silencer illustrated and described in United States Letters Patent Number 2,329,337, issued to Loren E. Criss and myself September 14, 1943.

The principal objects of my present invention are, to generally improve upon and simplify the construction of the valves disclosed in the aforesaid patent and patent application as well as other similar forms of ball cock flushing valves, further to provide simple and efficient means for controlling and silencing the flow of water through the valve, and from the latter into the flushing tank, to provide improved means for adjustably regulating the flow of water from the ball cock into the tank particularly, where conditions of relatively high pressures exist in the supply main and further, to provide simple and efficient means which acts automatically and positively, for preventing the siphoning of contaminated water into the flushing tank and from thence to the supply main.

A further object of my invention is to provide a ball cock flushing valve wherein a number of the principal parts are formed of water and acid proof material such as plastics, hard rubber or the like and the few metal parts being coated with enamel or plastics, thus provided a structure which will not be subject to rust or corrosion.

A further object of my invention is to provide a simple, practical and effective one-piece lever which connects the float carrying arm to the valve of the ball cock.

With the foregoing and other objects in view, my invention consists in certain novel features of construction and arrangement of parts which will be hereinafter more fully described and claimed and illustrated in the accompanying drawing, in which:

Fig. 1 is a vertical section, with parts in elevation of my improved ball cock flush valve.

Fig. 2 is a horizontal section taken on the line 2—2 of Fig. 1.

Fig. 3 is a detail vertical section taken on the line 3—3 of Fig. 1.

Fig. 4 is a horizontal section taken on the line 4—4 of Fig. 1.

Fig. 5 is a perspective view of a modified form of the lever to which the float arm is connected.

Fig. 6 is a detail sectional view showing a modified form of the discharge end of the tube which conducts water from the valve into the tank.

Fig. 7 is a detail section of a further modified form of the water discharge tube which leads from the ball cock.

Fig. 8 is a detail sectional view of a resilient latch which may be used with the pivot of the float arm lever.

Fig. 9 is a detail section taken on the line 9—9 of Fig. 8.

Referring by numerals to the accompanying drawing which illustrates a perferred embodiment of my invention, 10 designates a tube which extends through and is detachably and adjustably connected to the bottom of the flushing tank T by means of nuts 11 and a packing ring 12.

Connected to the lower end of tube 10 is a pipe 13 which leads from a main or source of water supply under pressure.

The nut on the inside of the tank is provided with a lateral extension 14 which terminates in an upwardly presented cone shaped lug 15. Tube 10 may be formed of metal coated with enamel, plastics or with rust and corrosion resistant material or said tube may be formed wholly of plastics, hard rubber or the like, and if so, said tube is formed with external longitudinal ribs 10a to provide rigidity and counteract bending strains. Screw seated on the upper end of tube 10 is the main body 16 of the ball cock valve housing, the same having an annular chamber 17, and clamped between the upper end of tube 10 and housing 16 is the flanged lower end of a nipple 18 formed of porcelain, glass or the like. Just above chamber 17 and nipple 18, the housing is shaped to form a short vertically disposed cylinder 19 in which is arranged to slide, a piston valve which controls the flow of water through the ball cock and projecting upward from the top of this cylinder are spaced ears 20, provided with transversely aligned apertures 21.

The piston valve comprises a lower part 22, an upper part 23, with a cup washer 24 between said parts and a packing disc 25 of leather, rubber or the like, seated in the underside of lower part 22 and which normally rests on the seat provided by the upper end of nipple 18.

The upper portion of lower part 22 which projects into upper part 23 is provided with a pocket 26 and passing therethrough and through the overlapping portions of parts 22 and 23 is a horizontally disposed pin 27. The coiled portion 28 of a wire link 29 is mounted on the central portion of pin 27 and at the upper end of the link the wire is formed into a pair of horizontally disposed spaced coils 30. These coils receive the ends 31 of a length of wire which is bent to form a lever for the float carrying arm 32, the end of which is threaded as designated by 33 for engagement with loops 34 formed in the wire and from said loops, the wire extends outwardly away from the ears 20 beneath the arm 31 as designated by 35, and a short distance away from said loops 34, the wire is formed into loops or rings 36 through which passes arm 35. From the loops 34, the wire extends outward and is rebent to form short outwardly projecting fingers 37 which enter the apertures 21 in ears 20, thus providing an axis for the float arm lever and from said fingers, the wire is extended downward as designated by 38 to the inwardly presented end portions 31 of said wire, which as above stated, are positioned in the coils 30.

Thus, the link 29 and those portions of the wire lever below the fingers 37 provide, in effect, a toggle arrangement which under the influence of the float carried by arm 31 is very effective in maintaining the piston valve on its seat and as the swinging movement of the link is limited in the recess 26 in the piston valve, the pivot point between the upper end of the link and the ends 31 of the wire lever cannot swing "past center" and thus lock the float in elevated position.

The advantages of the toggle leverage action just described is more fully set forth in the above referred to Patent No. 2,329,337.

Formed integral with and projecting laterally from the upper portion of housing 16, is a housing 39 having an annular chamber 40 which communicates with chamber 17 by means of a throat 17a and formed through the center of said housing 39 is a vertically disposed threaded opening 41.

An externally threaded short tube 42 is screw seated in the opening 41, and formed integral with said tube 42 and concentrically disposed therein is the upper portion of a tube 43, the lower open end of which is disposed around the upper portion of cone 15.

Mounted on the upper end of tube 43 is an umbrella shaped cap 44, same being spaced apart from the open upper end of tube 42. Formed through the wall of tube 43 below the upper end of tube 42 are apertures 45 which function to admit air into tube 43 to counteract and break any siphonic conditions which may develop in the flush valve.

Short horizontally disposed ducts 46 formed through the walls of tubes 42 and 43 connect chamber 40 with the duct through tube 43 and small ports 47 connect the lower portions of said ducts 46 with the annular space between tubes 42 and 43.

Secured within tube 43 just above the ducts 46 is the upper end of a funnel shaped member 48, the lower end of which terminates below said ducts and formed through the wall of this member is an aperture 49 above which, within said member, is a hood or deflector 50. This member 48 is for the purpose of directing a jet of water downward through the center of tube 43 during flushing operations and for admitting air to chamber 40 and thereby counteract any siphonic conditions which may arise in the valve.

Projecting from the side of housing 39 is a tubular projection 51, to which is connected one end of the refill tube 52. A jet opening 53 leads from chamber 40 into the chamber 54 within the projection 51 and formed through the wall of said projection between the tube 52 and jet opening are air inlet openings 55 (see Fig. 2).

Tubes 42 and 43, cap 44 and member 48 are all preferably formed of plastics, hard rubber or other rust, corrosion and acid proof material. Under normal conditions the piston valve is maintained on its seat at the upper end of nipple 18 by the float arm and lever, so that no water can discharge from tube 10 through the valve and as the latter is positioned above the surface of the water in the tank, all chambers in the valve housings and the upper portions of the tubes 10 and 43 are filled with air.

Should irregular conditions in the supply line or main develop siphonic action tending to draw contaminated water into the tank and from thence backward into the supply pipe, air will enter apertures 45 and pass into chambers 40 and 17 in the valve housings to effectively counteract and break such siphonic action when a flushing action takes place wherein the lowering of the float swings the wire lever on its axis causing the fingers 37 to lift the piston valve from its seat on nipple 18 whereby water under pressure will discharge from said nipple into chamber 17 and pass therefrom through throat 17a into chamber 40, thence through tube 43 where it discharges from the open end of said tube around and against cone 15 which deflects said water outwardly in all directions.

Water from chamber 40 will also flow upwardly through tube 42 between the ducts 46, and a portion of this water flows over the open upper end of said tube to strike against cap 44 and thereby be deflected downward over housing 39 and thence downward around tube 43 and at the same time, the other portion of this water will flow through apertures 45, thence downward through funnel 48 and discharge in jet form downwardly through tube 43.

Thus, all the water passing through the ball cock is caused to flow downwardly through and around the tube 43, which action effectively silences the flow of said water as it discharges from the valve housing and the spreading of the water by cone 15, silences the flow of the water as it discharges from said tube into the tank.

The degree of annular opening between the lower end of tube 43 and cone 15 may be adjusted by screwing tube 42, which carries tube 43 upwardly or downwardly in the threaded opening 42, such adjustment being necessary in order to enable the valve to function properly where water supplies of different pressures are encountered and particularly, where the pressure is high.

In Fig. 6 I have shown a short tube 43a screw seated on the lower end of tube 43, thus enabling the discharge of water onto the cone and into the tank to be accurately regulated, in relation to the water pressure.

In Fig. 7 the cone 15 is shown provided with an upwardly projecting guide rod 15a which slides through a collar 15b secured within the lower portion of tube 43.

In Fig. 5 I have shown a modified form of float arm lever which is constructed from a single piece of thin ribbon-like metal, bent to form parallel members 60 with portions of the metal at the centers of said members bent toward each other to form transverse walls 61.

Formed on the free ends of the members 60 are inturned studs 62 which pivotally engage the upper end of a link 63, corresponding to link 29. Pressed outwardly from the forward portion of members 60, above the stud 62 are fulcrum studs 64 which engage in the bearings 21 in ears 20. Walls 61 and the connecting wall 65 at the end of the lever are provided with apertures 66 which receive the float carrying arm 32.

In Figs. 8 and 9 I have shown means for maintaining the fulcrum fingers 37 in operative position within the bearings 21 and to prevent lost motion between said pins and bearings.

In this construction an open loop 67 of resilient wire has its ends 68 extended in transverse alignment and said ends, with the fingers 37, extend into the bearings 21 and rock therein without lost motion.

By compressing open loop 67, the ends 68 may be drawn toward each other a sufficient distance to enable same to be withdrawn from the bearings or to be inserted therein.

Thus, it will be seen that I have provided an anti-siphon ball cock valve which is simple in structure, inexpensive of manufacture and very effective in performing its intended functions.

It will be understood that minor changes in the size, form and construction of my improved ball cock valve may be made and substituted for those herein shown and described without departing from the spirit of my invention, the scope of which is set forth in the appended claims.

I claim as my invention:

1. The combination with a fluid tank supply pipe, a valve housing mounted thereupon, said housing having primary and secondary chambers and float controlled valvular means for controlling the flow of water from said supply pipe, a short tubular member passing vertically through the secondary chamber in said housing, a tube secured to and passing axially through said short tubular member and depending a substantial distance therefrom, the upper portion of said second mentioned tube being spaced apart from said short tube, radial ducts establishing communication between the secondary chamber and the duct through said second mentioned tube, there being ports providing communication between said radial ducts and the chamber within the lower portion of said short tubular member, and there being ports formed through the wall of the second mentioned tube for establishing communication between the duct through said tube and the chamber in the first mentioned tube above said radial ducts.

2. The combination set forth in claim 1, with a cap on top of said second mentioned tube above said short tube.

3. The combination set forth in claim 1, with a tubular conical deflector seated in said second mentioned tube, opposite the inner ends of said radial ducts.

4. The combination as set forth in claim 1, with a tubular deflector seated in said second mentioned tube opposite the inner ends of said radial ducts, there being a port formed in the wall of said deflector in alignment with one of said radial ducts and a downwardly curved deflector within said first mentioned deflector above the port therein.

JESSE C. OWENS.